(12) United States Patent
Chin et al.

(10) Patent No.: US 8,338,035 B2
(45) Date of Patent: Dec. 25, 2012

(54) SEPARATOR FOR FUEL CELL

(75) Inventors: Sang Mun Chin, Seoul (KR); Sae Hoon Kim, Yongin (KR); Yoo Chang Yang, Gunpo (KR); Chul Ho Yim, Gyeonggi-do (KR); Suk Min Baeck, Yongin (KR); Seong Il Heo, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 503 days.

(21) Appl. No.: 12/622,621

(22) Filed: Nov. 20, 2009

(65) Prior Publication Data

US 2011/0033782 A1 Feb. 10, 2011

(30) Foreign Application Priority Data

Aug. 4, 2009 (KR) .................. 10-2009-0071681

(51) Int. Cl.
*H01M 2/16* (2006.01)
(52) U.S. Cl. ......... 429/247; 429/142; 429/143; 429/246
(58) Field of Classification Search .................. None
See application file for complete search history.

(56) References Cited

U.S. PATENT DOCUMENTS

| 6,840,969 B2 | 1/2005 | Kobayashi et al. |
| 2007/0207365 A1* | 9/2007 | Ohnuma ........................ 429/38 |

FOREIGN PATENT DOCUMENTS

| JP | 05-029000 A | 2/1993 |
| JP | 2004-342493 A | 12/2004 |
| JP | 2007-317428 A | 12/2007 |
| KR | 10-2001-0060112 A | 7/2001 |
| KR | 10-2003-0005371 A | 1/2003 |
| KR | 10-2005-0016963 | 2/2005 |
| KR | 10-2008-0084917 A | 9/2008 |

* cited by examiner

*Primary Examiner* — Yelena G Gakh
(74) *Attorney, Agent, or Firm* — Edwards Wildman Palmer LLP; Peter F. Corless

(57) ABSTRACT

The present invention preferably provides a separator for a fuel cell, in which a strength reinforcing means is integrally formed in a region, which is not supported by a gasket, over the region from manifolds, through which reactant gases and coolant are supplied, to a reaction flow field, in which a reaction takes place, thus suitably preventing local deformation of the separator.

4 Claims, 10 Drawing Sheets

CROSS-SECTION OF A-A

CROSS-SECTION OF B-B

SEPARATOR FOR FUEL CELL

CROSS-REFERENCE TO RELATED APPLICATION

This application claims under 35 U.S.C. §119(a) the benefit of Korean Patent Application No. 10-2009-0071681 filed Aug. 4, 2009, the entire contents of which are incorporated herein by reference.

BACKGROUND (a) Technical Field

The present disclosure relates, in general, to a separator for a fuel cell. More particularly, in preferred embodiments, the present invention relates to a separator for a fuel cell, in which a strength reinforcing means is integrally formed in a region, and further is not supported by a gasket, over the region from manifolds, through which reactant gases and coolant are suitably supplied, to a reaction flow field, in which a reaction takes place, thus suitably preventing local deformation of the separator.

(b) Background Art

Figure 8:
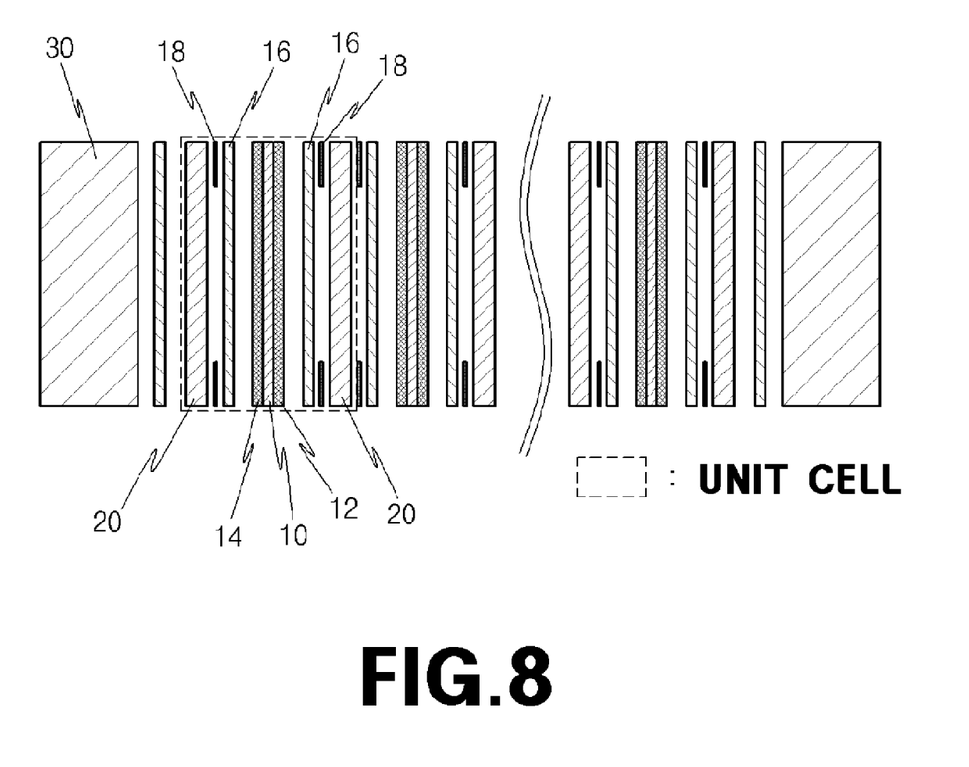
FIG. 8 is a schematic diagram illustrating a structure of a fuel cell stack Reference numerals set forth in the Drawings includes reference to the following elements as further discussed below.

A typical structure of a fuel cell stack will be described briefly with respect to exemplary FIG. 8. Preferably, a membrane electrode assembly (MEA) is located in the middle of the fuel cell stack and includes a polymer electrolyte membrane 10, through which hydrogen ions (protons) are transported, and an electrode/catalyst layer such as an air electrode (cathode) 12 and a fuel electrode (anode) 14, in which an electrochemical reaction between hydrogen and oxygen takes place, suitably disposed on each of both sides of the polymer electrolyte membrane 10.

Preferably, a gas diffusion layer (GDL) 16 and a gasket 18 are sequentially stacked on both sides of the MEA, where the cathode 12 and the anode 14 are located. A separator 20 including flow fields for supplying fuel and discharging water generated by the reaction is located on the outside of the GDL 16, and an end plate 30 for supporting and fixing the above-described components is suitably connected to each of both ends thereof.

Accordingly, at the anode 14 of the fuel cell stack, hydrogen is dissociated into hydrogen ions (protons, $H^+$) and electrons ($e^-$) by an oxidation reaction of hydrogen. Preferably, the hydrogen ions and electrons are transmitted to the cathode 12 through the electrolyte membrane 10 and the separator 20, respectively. At the cathode 12, water is suitably produced by an electrochemical reaction in which the hydrogen ions and electrons transmitted from the anode 14 and the oxygen in air participate and, at the same time, electrical energy is suitably produced by the flow of electrons.

The structure of a conventional separator formed of a thin metal plate is described herein.

Figure 6:
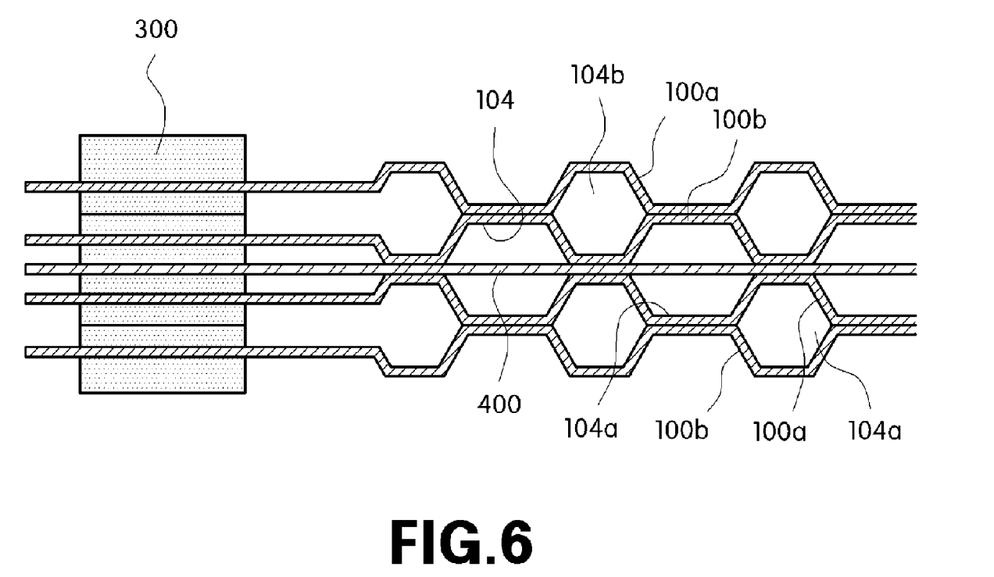
FIGS. 6 and 7 are cross-sectional views illustrating a conventional separator for a fuel cell.
Figure 7:
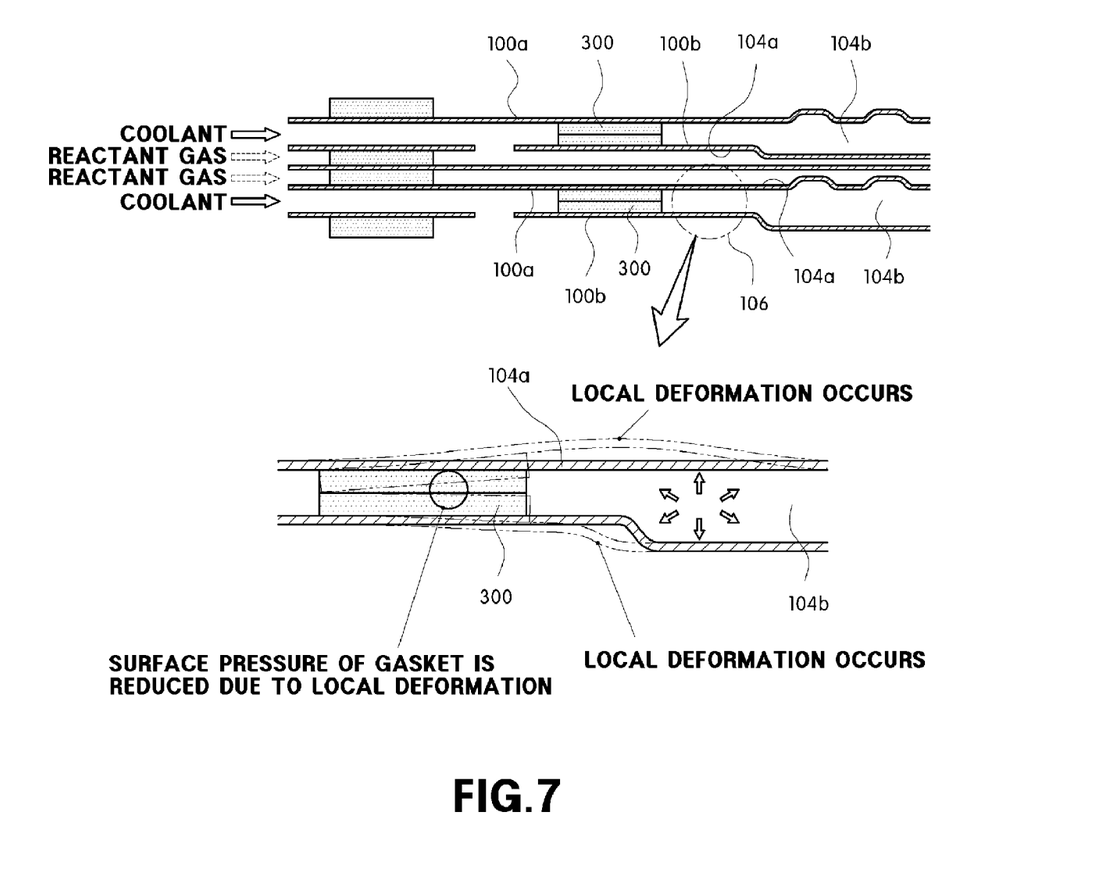

FIG. 6 is a cross-sectional view taken along the width of an exemplary conventional separator, and FIG. 7 is a cross-sectional view taken along the length of the conventional separator.

A metal separator formed of a thin metal plate having a thickness of 0.1 to 0.2 mm by a molding process such as stamping to have flow fields can considerably reduce the manufacturing time and cost compared to a graphite separator formed by a mechanical process.

Preferably, a pair of first separators 100a are suitably stacked on one side of a membrane electrode assembly (MEA) 400 including an electrolyte membrane and a pair of second separators 100b are suitably stacked on the other side of the MEA 400, thus forming a unit cell. Preferably, a plurality of such unit cells are suitably stacked and an end plate is suitably connected to each of both ends thereof, thus forming a fuel cell stack.

The first and second separators 100a and 100b form reaction flow fields 104a such as an anode flow field through which hydrogen flows and a cathode flow field through which air flows.

The reaction flow field 104a (anode flow field or cathode flow field) is suitably formed between the bottom side of the first separator 100a and the top side of the MEA 400, the reaction flow field 104a (anode flow field or cathode flow field) is also formed between the top side of the second separator 100b and the bottom side of the MEA 400, and a coolant flow field 104b is suitably formed in a space between the pair of first separators 100a and in a space between the pair of second separators 100b.

Preferably, a gasket 300, which serves to suitably prevent reactant gases from leaking to the outside and to support the stacked separators, is suitably inserted and fixed to the corners of manifolds, through which the reactant gases are suitably supplied to and discharged from the respective reaction flow fields of the first and second separators 100a and 100b, and the outer circumferences of the first and second separators 100a and 100b.

Preferably, the separator 100 integrally formed with the gasket 300 may be divided into a reactant gas and coolant entrance region 102, a flow diffusion region 106, and a reaction flow field region 104 with respect to the flow path of the reactant gases.

Hydrogen, air, and coolant manifolds 112, 114, and 116 each having a rectangular hole shape and suitably formed on both ends of the separator 100 are preferably provided in the reactant gas and coolant entrance region 102. The gasket 300 is suitably attached to both sides of each of the manifolds 112, 114, and 116 to maintain airtightness of the reactant gases and suitably support the stacked separators.

Accordingly, fluids flow from the reactant gas and coolant entrance region 102 to the reaction flow field region 104 through the flow diffusion region 106, in which no support such as the gasket is provided. Therefore, local deformation easily occurs in this region by a pressure difference between the reactant gases and the coolant during operation of the fuel cell.

The reaction for generating electricity takes place in the reaction flow field region 104, in which the anode flow field, the cathode flow field, and the coolant flow field are suitably formed. Since the respective flow fields have concave-convex portions, in which concave and convex shapes are repeated along the width of the flow fields, the concave-convex portions that form the respective flow fields suitably support the stacked separators.

Preferably, in the conventional separator having the above-described structure, while the reactant gas and coolant entrance region and the reaction flow field region are suitably supported by the gasket or the concave-convex portions, the flow diffusion region is not suitably supported by any means. Therefore, there are problems in that local deformation may occur due to the pressure difference between the reactant gases and the coolant during operation of the fuel cell to suitably reduce the surface pressure of the adjacent gasket, which causes the gasket to get loose, thus suitably deteriorating the airtight performance of the gasket.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention preferably provides a separator for a fuel cell, in which a strength reinforcing means is integrally formed in a region, which is not suitably supported by a gasket, for example, preferably, in a flow diffusion region of the separator, in which any suitable support means is not provided, over the region from manifolds, through which reactant gases and coolant are suitably supplied, to a reaction flow field, in which a reaction takes place, thus suitably preventing local deformation of the separator.

In a preferred embodiment, the present invention provides a separator for a fuel cell, in which a reactant gas and coolant entrance region is suitably provided at each of both ends, a reaction flow field region is suitably provided between the reactant gas and coolant entrance regions, and a flow diffusion region is suitably disposed between the reactant gas and coolant entrance region and the reaction flow field region, the separator preferably including, but not only limited to, a strength reinforcing means integrally formed in the flow diffusion region to suitably prevent local deformation of the separator.

In a preferred embodiment, the strength reinforcing means may be integrally formed in the flow diffusion region by work-hardening and may preferably include a main rib suitably arranged in the width direction of the flow diffusion region and a plurality of sub-ribs extending from the main rib adjacent to a gasket attached to the reaction gas and coolant entrance region.

In another preferred embodiment, the strength reinforcing means may be integrally formed in the flow diffusion region by work-hardening and suitably include a plurality of forming sections formed in a circular or polygonal shape.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated by the accompanying drawings which are given hereinbelow by way of illustration only, and thus are not limitative of the present invention, and wherein.

| | |
|---|---|
| 100: separator | 100a: first separator |
| 100b: second separator | |
| 102: reactant gas and coolant entrance region | |
| 104: reaction flow field | 104a: reaction flow field |
| 104b: coolant flow field | 106: flow diffusion region |
| 112: hydrogen manifold | 114: air manifold |
| 116: coolant manifold | 200: strength reinforcing means |
| 202: main rib | 204: sub-rib |
| 206: forming section | 300: gasket |
| 400: membrane electrode assembly | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The present invention, in a first aspect, features a separator for a fuel cell, in which a reactant gas and coolant entrance region is provided at each of both ends, a reaction flow field region is provided between the reactant gas and coolant entrance regions, and a flow diffusion region is disposed between the reactant gas and coolant entrance region and the reaction flow field region.

In one embodiment, the separator comprises a strength reinforcing means.

In another embodiment, the strength reinforcing means is integrally formed in the flow diffusion region to prevent local deformation of the separator.

In another further embodiment, the strength reinforcing means is integrally formed in the flow diffusion region by work-hardening.

In still another further embodiment, the strength reinforcing means further comprises a main rib arranged in the width direction of the flow diffusion region and a plurality of sub-ribs extending from the main rib adjacent to a gasket attached to the reaction gas and coolant entrance region.

In another related embodiment, the strength reinforcing means further comprises a plurality of forming sections formed in a circular or polygonal shape.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1A:
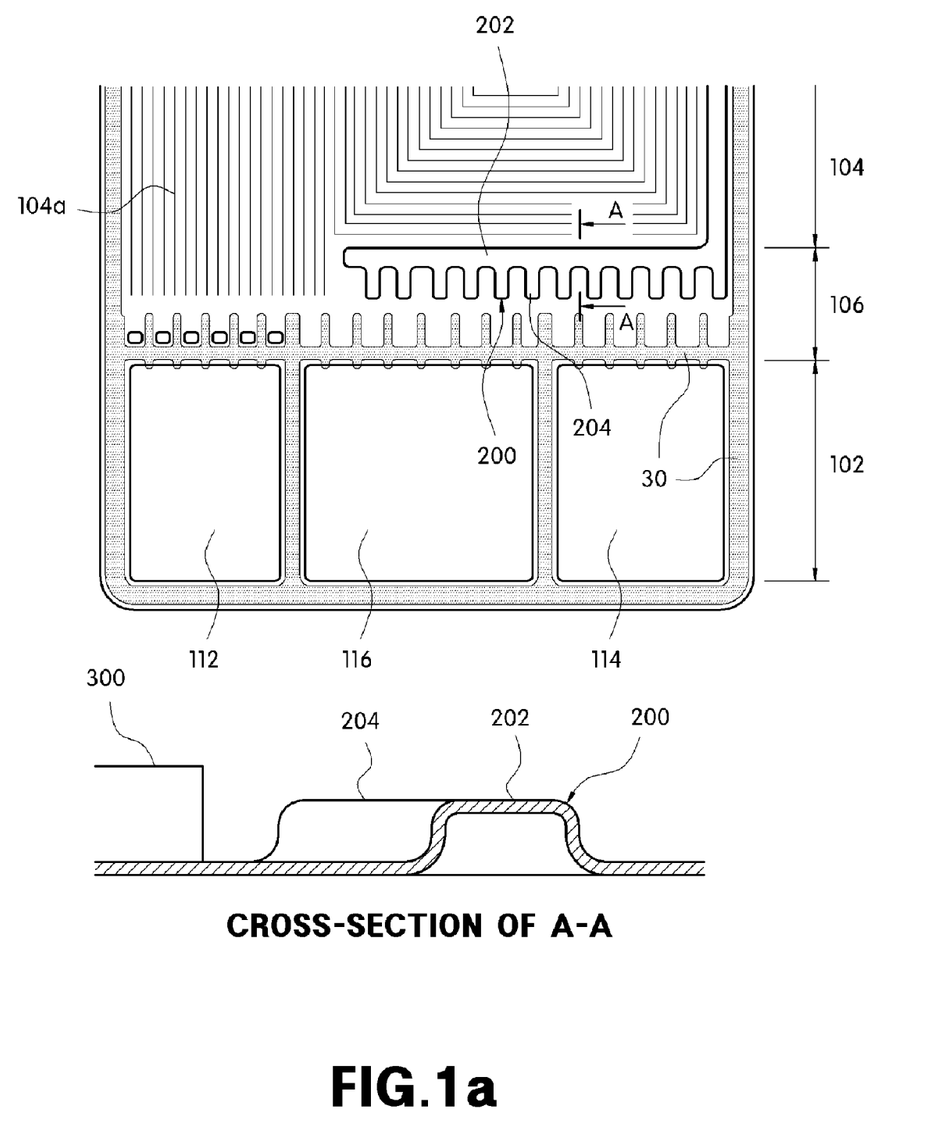
FIGS. 1A and 1B are perspective views illustrating a strength reinforcing means of a separator for a fuel cell in accordance with an exemplary embodiment of the present invention.
Figure 1B:
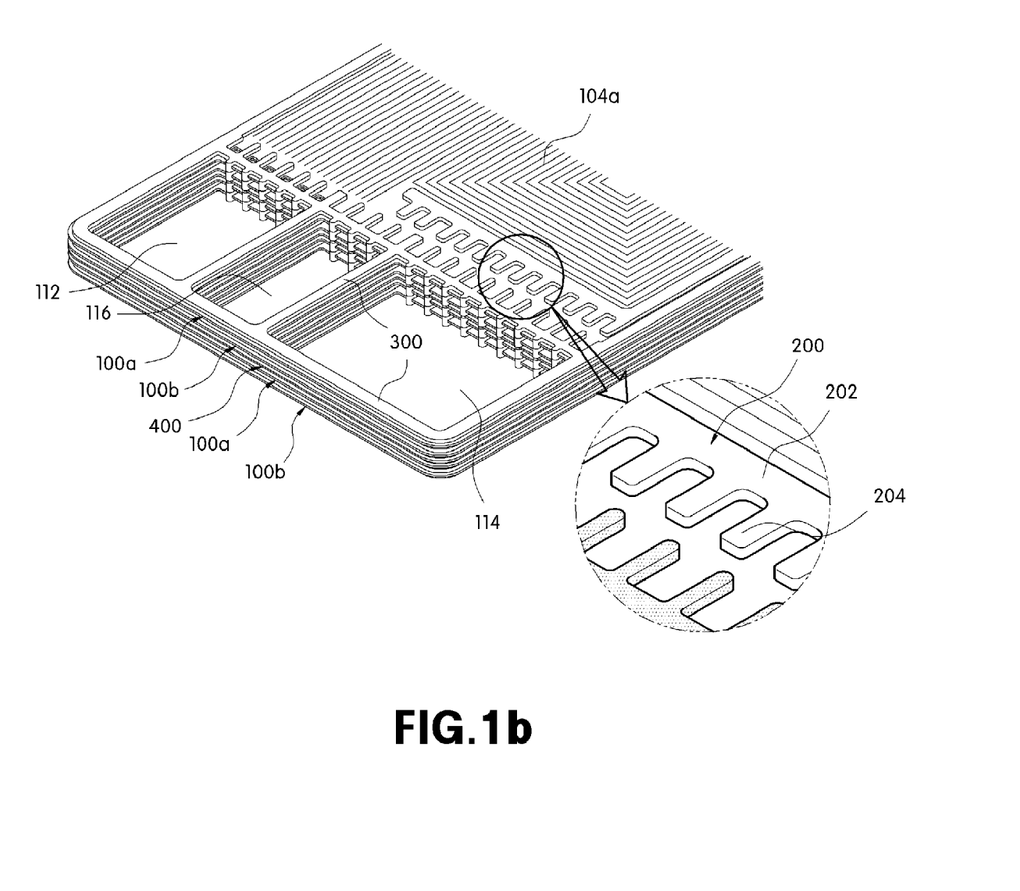
Figure 2A:
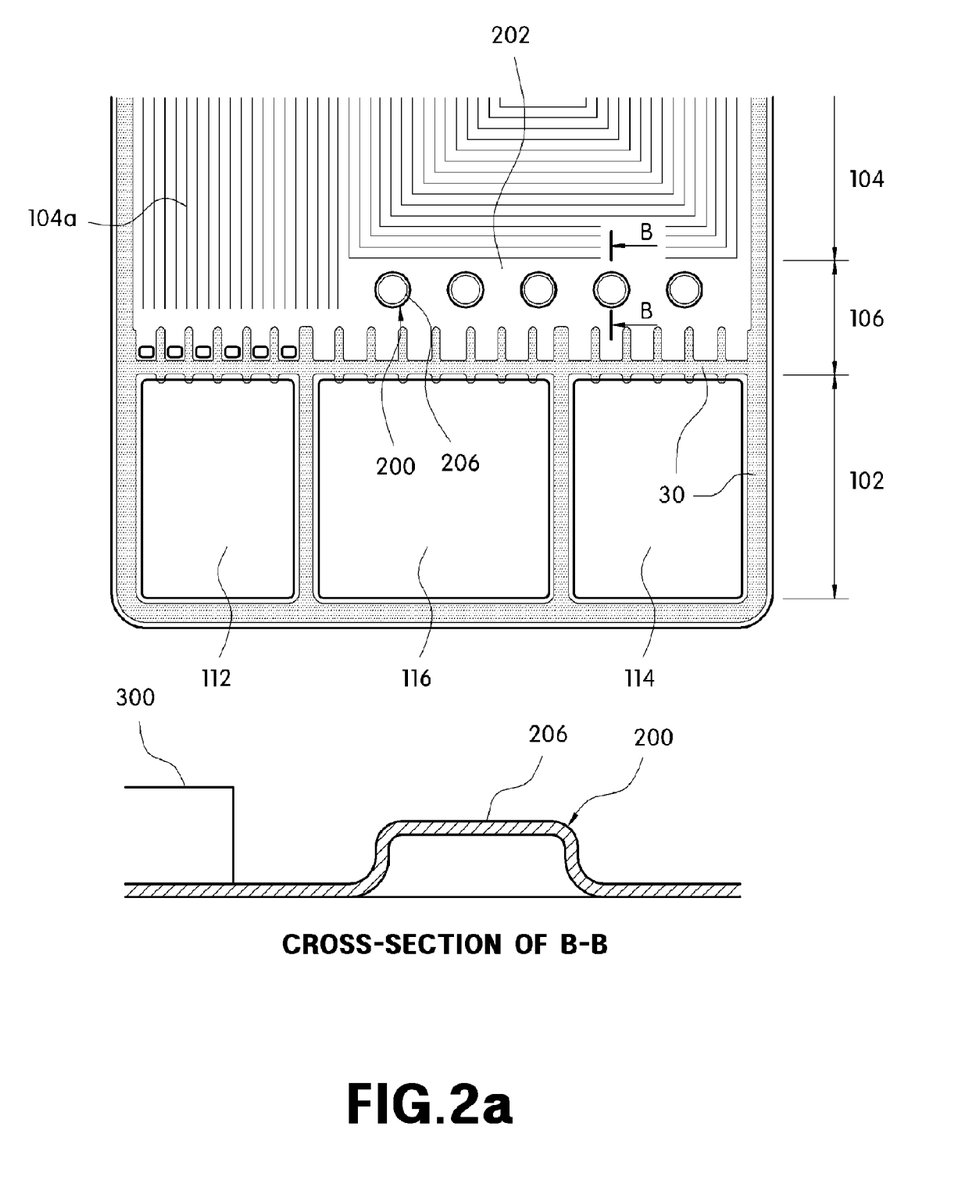
FIGS. 2A and 2B are perspective views illustrating a strength reinforcing means of a separator for a fuel cell in accordance with another exemplary embodiment of the present invention.
Figure 2B:
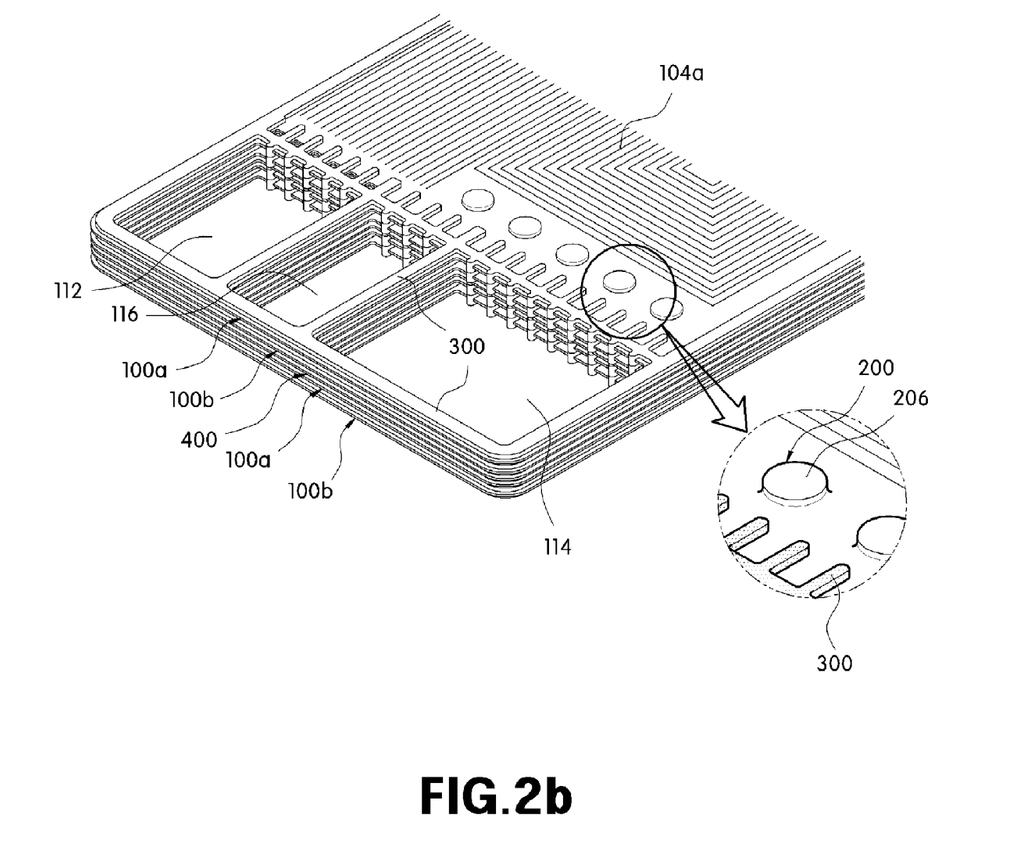

FIGS. 1A and 1B are perspective views illustrating a strength reinforcing means of a separator for a fuel cell in accordance with an exemplary embodiment of the present invention, and FIGS. 2A and 2B are perspective views illustrating a strength reinforcing means of a separator for a fuel cell in accordance other exemplary embodiments of the present invention.

According to certain preferred embodiments, a separator 100 of the present invention is suitably formed of a thin metal plate and preferably includes a pair of first and second separators 100a and 100b, which form separate hydrogen, air, and coolant flow fields.

Preferably, the pair of first and second separators 100a and 100b are suitably stacked on both sides of a membrane electrode assembly (MEA) 400 including an electrolyte membrane, thus suitably forming a unit cell of a fuel cell. In further preferred embodiment, a plurality of unit cells are suitably stacked and an end plate is suitably connected to each of both ends thereof, thus forming a fuel cell stack.

According to further exemplary embodiments, a gasket 300 is integrally injection-molded on both sides of the first and second separators 100a and 100b around the outer circumferences of the respective separators and manifolds.

Figure 3:
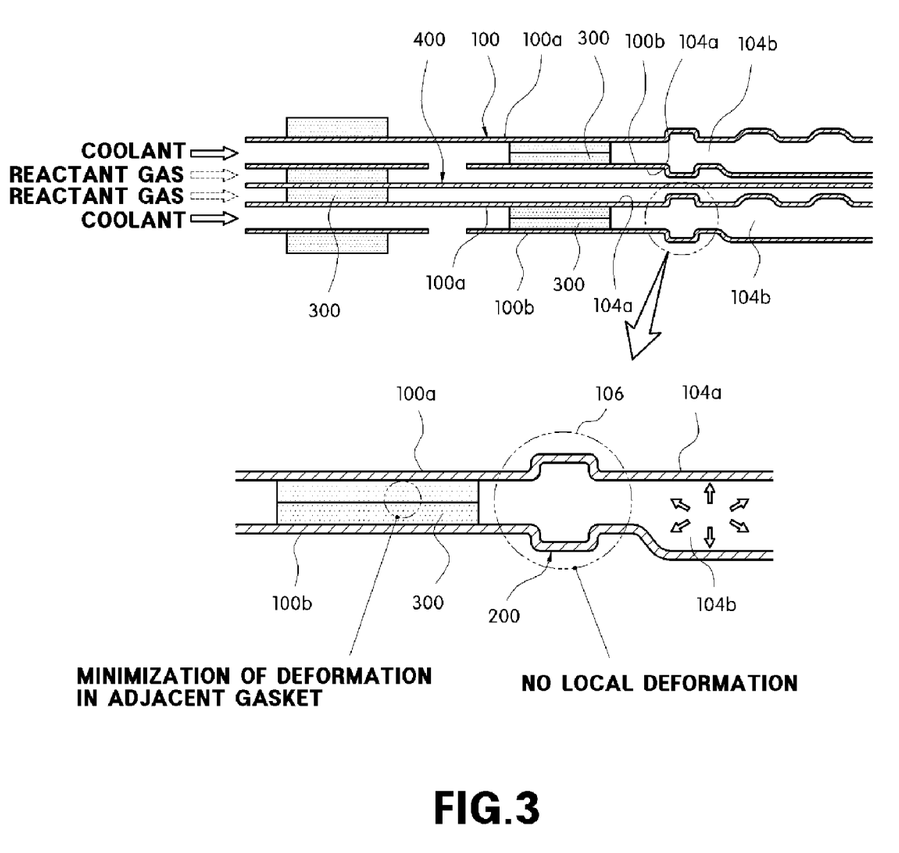
FIG. 3 is a cross-sectional view illustrating the operation for preventing local deformation in a flow diffusion region of the separator for the fuel cell in accordance with the present invention.

In other preferred embodiments, for example referring to FIG. 3, a reaction flow field 104a (anode flow field or cathode flow field) is suitably formed between the bottom side of the first separator 100a and the top side of the MEA 400, a reaction flow field 104a (anode flow field or cathode flow field) is also suitably formed between the top side of the second separator 100b and the bottom side of the MEA 400, and a coolant flow field 104b is suitably formed in a space between the pair of first separators 100a and in a space between the pair of second separators 100b.

Preferably, these first and second separators 100a and 100b may be divided into a reactant gas and coolant entrance region 102 suitably formed at each of both ends thereof, a flow diffusion region 106 suitably formed therebetween, and a reaction flow field region 104 suitably formed between the reaction gas and coolant entrance region 102 and the reaction flow field region 104 along the flow direction of fluids.

According to preferred embodiments, the gasket 300 is integrally injection-molded on both sides of the outer circumference of the reactant gas and coolant entrance region 102 of the first and second separators 100a and 100b and on both sides of the outer circumference of the hydrogen, air, and coolant manifolds 112, 114, and 116. Accordingly, in further preferred embodiments, the gasket 300 serves to suitably maintain the airtightness and disperse the stress when the first and second separators 100a and 100b are suitably stacked on the MEA 400.

Further, a reaction for generating electricity suitably takes place in the reaction flow field region 104, in which the anode flow field, the cathode flow field, and the coolant flow field are suitably formed. Preferably, since the respective flow fields have concave-convex portions, in which concave and convex shapes are repeated along the width of the flow fields, the concave-convex portions that form the respective flow fields are closely adhered to each other to support the first and second separators 100a and 100b when stacked.

According to further preferred embodiments of the present invention, a strength reinforcing means 200 for preventing local deformation of the separator 100 is suitably integrally formed in the flow diffusion region 106.

For example, as shown in FIGS. 1A and 1B, the strength reinforcing means 200 in accordance with an exemplary embodiment of the present invention preferably includes a main rib 202 arranged in the width direction of the flow diffusion region 106 and a plurality of sub-ribs 204 extending from the main rib 202 to the gasket 300 suitably attached to the reactant gas and coolant entrance region 102.

Conventionally, any support means is not provided in the flow diffusion region 106 of the separators 100; however, according to preferred embodiments of the present invention, the strength reinforcing means 200 including the main rib 202 and the sub-ribs 204 is suitably integrally formed in the flow diffusion region 106, and thus the strength is increased by work-hardening. Accordingly, it is possible to reduce the local deformation caused by the pressure difference between the reactant gases (hydrogen and air) flowing through the reaction flow field on one surface of each of the separators and the coolant flowing through the coolant flow field on the other surface thereof.

Accordingly, in certain exemplary embodiments, it is preferable that the straight distance between the respective ribs 202 and 204 of the strength reinforcing means 200 and the gasket 300 be suitably smaller than the width of the gasket 300 adjacent to the respective ribs 202 and 204, thus creating a space (mold space) in which a molding material flows properly during injection-molding of the gasket 300.

Figure 4:
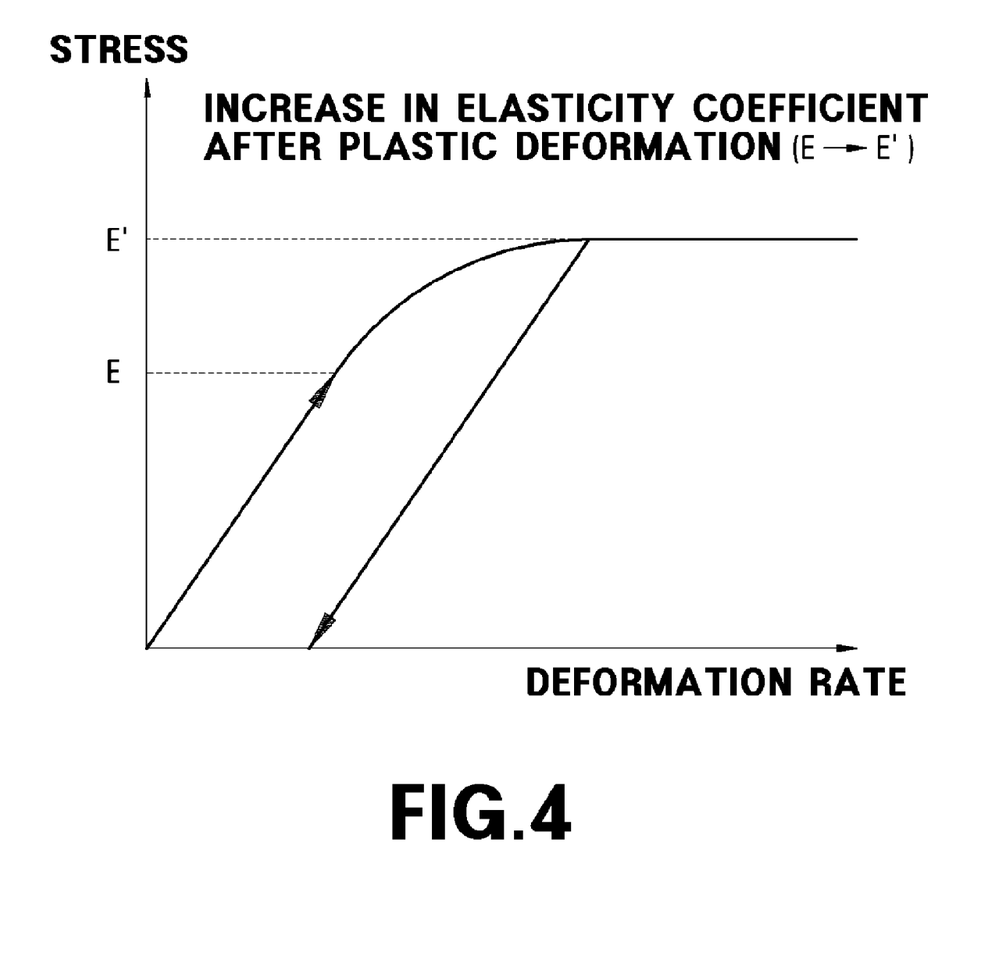
FIG. 4 is a graph illustrating an increase in the elasticity coefficient after plastic deformation due to work-hardening.

According to other exemplary embodiments, for example as shown in FIG. 4, work-hardening is meant to refer to when plastic deformation is suitably caused by applying stress of more than an elasticity limit to a metal material, the elasticity coefficient is suitably increased and the resistance against the plastic deformation is suitably increased. Accordingly, in preferred embodiments of the present invention, the work-hardening is used to provide the strength reinforcing means 200 as a local plastic deformation area in the flow diffusion region 106 in which the deformation easily occurs, thus suitably increasing the strength of the separators and maintaining the surface pressure of the gasket 300 adjacent to the flow diffusion region 106 in which the local deformation may occur. Accordingly, in further preferred embodiments of the present invention, it is possible to constantly maintain the airtightness of the gasket.

According to another preferred embodiment, for example as shown in FIGS. 2A and 2B, a strength reinforcing means 200 includes a plurality of circular or polygonal forming sections 206 suitably formed over the flow diffusion region 106.

Preferably, the forming sections 206 are suitably formed independently over the flow diffusion region 106 by punching, for example, so as not to affect the flow of the reactant gases and coolant. According to further embodiments, it is preferable that the straight distance between the plurality of forming sections 206 be suitably smaller than the diameter of each forming section 206 such that the forming sections 206 are densely arranged and the strength of the separators is further increased.

Accordingly, the forming sections 206 also suitably increase the strength of the flow diffusion region 106, in which the deformation easily occurs, thus suitably minimizing the local deformation.

Figure 5:
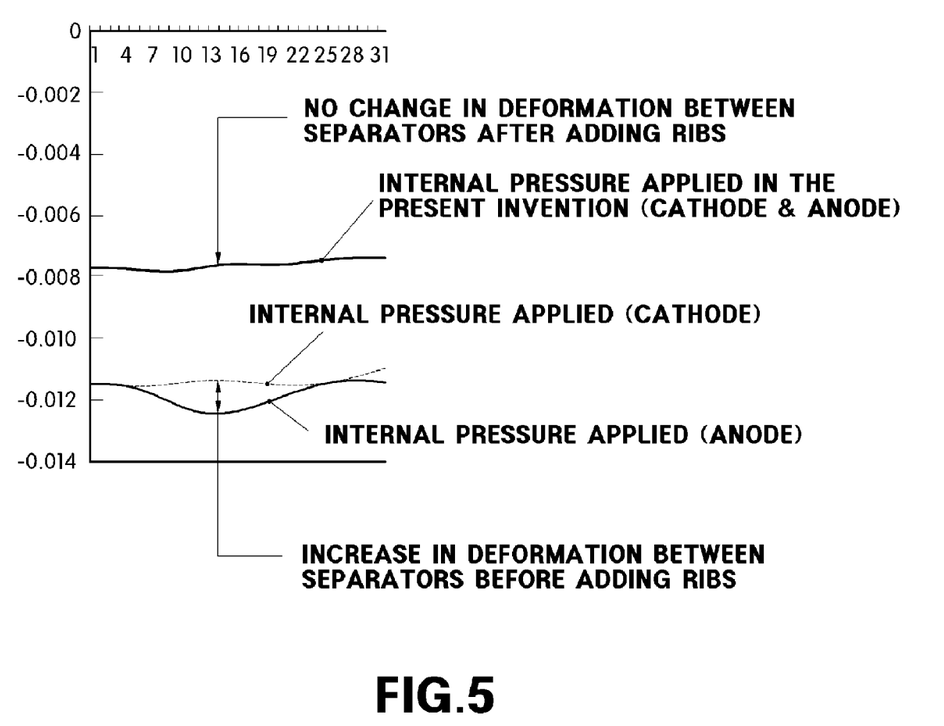
FIG. 5 is a graph illustrating a change in deformation before and after a strength reinforcing means is formed on the separator for the fuel cell in accordance with the present invention.

In further preferred embodiments, since the strength reinforcing means 200 is suitably provided over the flow diffusion region 106 of the separators in which any support means is not provided, the amount of local deformation is considerably reduced compared to the conventional separator having no strength reinforcing means, for example as shown in the graph of FIG. 5.

As described above, the present invention preferably provides the following effects.

According to certain preferred embodiments of the present invention, the strength reinforcing means is suitably integrally formed in the flow diffusion region, in which any support means such as the gasket is not provided, over the region from the manifolds, through which reactant gases and coolant are suitably supplied, to the reaction flow field, in which a reaction takes place, thus suitably preventing local deformation of the separator and deterioration of airtight performance of the gasket.

Accordingly, the strength reinforcing means such as ribs and forming portions is preferably provided in the flow diffusion region, in which no suitable support means is provided, to increase the strength by the work-hardening, thus it is possible to suitably minimize the local deformation caused by the pressure difference between the reactant gases flowing through the reaction flow field on one surface of each of the separators and the coolant flowing through the coolant flow field on the other surface thereof.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A separator for a fuel cell, in which a reactant gas and coolant entrance region is provided at each of both ends, a reaction flow field region is provided between the reactant gas and coolant entrance regions, a flow diffusion region is disposed between the reactant gas and coolant entrance region and the reaction flow field region, and a gasket is attached to both sides of each of manifolds and the reactant gas and coolant entrance region, the separator comprising a strength reinforcing means integrally formed in the flow diffusion region which is not supported by the gasket over the region from manifolds, through which reactant gases and coolant are suitably supplied, to prevent local deformation of the separator.

2. The separator of claim 1, wherein the strength reinforcing means is integrally formed in the flow diffusion region by work-hardening and comprises a main rib arranged in the width direction of the flow diffusion region and a plurality of sub-ribs extending from the main rib adjacent to a gasket attached to the reaction gas and coolant entrance region.

3. The separator for a fuel cell of claim 1, wherein the strength reinforcing means is integrally formed in the flow diffusion region by work-hardening.

4. The separator for c fuel cell of claim 1, wherein the strength reinforcing means further comprises a plurality of forming sections formed in a circular or polygonal shape.

* * * * *